United States Patent
Schmidt

(12) 
(10) Patent No.: US 6,278,481 B1
(45) Date of Patent: *Aug. 21, 2001

(54) PHOTOCARD THAT IS INSERTED INTO A NON-DIGITAL CAMERA TO ENABLE THE NON-DIGITAL CAMERA TO TAKE DIGITAL PHOTOGRAPHIC IMAGES

(75) Inventor: Dominik J. Schmidt, San Jose, CA (US)

(73) Assignee: Airify Communications, Inc., Mountainview, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/723,623

(22) Filed: Oct. 3, 1996

(51) Int. Cl.$^7$ ............................... H04N 5/76; H04N 7/18
(52) U.S. Cl. ..................... 348/64; 348/233; 348/375; 396/429
(58) Field of Search ........................ 396/429, 511, 396/535; 348/64, 207, 222, 231, 232, 233, 362, 363, 373, 375, 376, 552, 220; 358/906, 909.1; H04N 7/18, 9/47, 5/76, 5/225

(56) References Cited

U.S. PATENT DOCUMENTS

| | | | |
|---|---|---|---|
| 4,814,811 | * | 3/1989 | Saito et al. ............................ 354/412 |
| 5,150,215 | * | 9/1992 | Shi .......................................... 358/209 |
| 5,153,421 | * | 10/1992 | Tandon .................................. 348/243 |
| 5,164,751 | * | 11/1992 | Weyer .................................... 354/76 |
| 5,179,478 | | 1/1993 | Aoki . |
| 5,282,040 | * | 1/1994 | Sapir ..................................... 358/209 |
| 5,452,000 | | 9/1995 | Sapir . |
| 5,561,458 | * | 10/1996 | Cronin .................................. 348/64 |
| 5,570,146 | * | 10/1996 | Collette ................................ 396/429 |
| 5,581,299 | * | 12/1996 | Raney .................................. 348/232 |
| 5,612,732 | | 3/1997 | Yuyama et al. . |
| 5,666,159 | * | 9/1997 | Parulski et al. ....................... 348/211 |
| 5,678,102 | * | 10/1997 | Chamberlain, IV ................. 396/429 |
| 5,699,458 | * | 12/1997 | Sprague ............................... 382/250 |
| 5,893,037 | * | 4/1999 | Reele .................................... 348/64 |
| 6,128,447 | * | 10/2000 | Nelson .................................. 396/429 |
| 6,181,883 | * | 1/2001 | Oswal .................................. 396/429 |

FOREIGN PATENT DOCUMENTS

PCT/US97/17298    9/1997 (WO).

* cited by examiner

*Primary Examiner*—Wendy R. Garber
*Assistant Examiner*—Ngoc-Yen Vu
(74) *Attorney, Agent, or Firm*—Tran & Associates; Bao Tran

(57) ABSTRACT

A digital camera that operates inside and in conjunction with a non-digital camera, enabling the user to continue to use the non-digital camera, controls and associated lens, flashes, etc. The digital camera includes an imager which senses the image to be recorded and a light detector which detects the existence of light due to the opening of the shutter aperture of the non-digital camera. The light detector controls the imager such that an image is recorded and output from the imager when the light detector detects the opening of the shutter aperture which occurs when the photographer depresses the shutter button to take a picture. Preferably the digital camera includes a memory for storage of the images recorded. These images can then be subsequently output to an external device for further processing or display.

36 Claims, 4 Drawing Sheets

PHOTOCARD THAT IS INSERTED INTO A NON-DIGITAL CAMERA TO ENABLE THE NON-DIGITAL CAMERA TO TAKE DIGITAL PHOTOGRAPHIC IMAGES

ART BACKGROUND

1. Field of the Invention

The present invention relates to photography and to electronics, and more particularly to digital photographic equipment.

2. Background of the Invention

A typical 35 millimeter camera boasts a range of features, from the simple "point and shoot" camera function to functions that provide sophisticated photographic effects. Photographers choose 35 millimeter cameras for a variety of reasons, including the variety of cameras and features available and the standardization of accessories such as additional lenses. Also, many experienced photographers have an intuitive understanding of the effect that the features, lenses, and other photographic equipment will have on light passing through the lens and striking the film. For many photographers, camera equipment represents a substantial investment both in terms of cost and the time necessary to become familiar with the particular features of a particular camera.

However, in some situations, a standard 35 mm camera is simply inadequate. When extremely fast film is needed, for example, in extremely dim light or when extremely fast objects are being photographed, many cameras do not have a sufficiently fast shutter speed to capture the image. Also, less-expensive cameras frequently are not upgradable. Thus, photographers who purchase a simple, low cost camera having a limited set of features typically cannot upgrade the camera to include more features and end up purchasing a new camera having the desired features.

These 35 millimeter film is sometimes difficult for a photographer to handle. There is the risk of accidental exposure of film to light, the risk of damaging a negative during developing, and the difficulty in making a high-quality reproduction from a print when the negative is unavailable are problems inherent in film-based photography. Furthermore, 35 millimeter film is available only in 12, 24, and 36 exposures, a limitation that requires a photographer to change film frequently. This is especially problematic when replacing film in a camera is difficult or impossible process. For example an underwater photographer cannot change the film in the camera when underwater; therefore the photographer typically carries a number of cameras in order to shoot more than one roll of pictures.

Digital camera technology has offered an alternative to ordinary photographic equipment. Digital cameras capturing both still shots and moving images allow modern photographers a lot of flexibility to enhance and digitally process video frames by use of a computer, but often require extremely expensive equipment beyond the price range of many photographers. Such cameras are also wholly incompatible with the "analog" film-based photography equipment in which many photographers have invested time and money, and with which many photographers are familiar.

The cost of starting all over with digital photographic equipment, considering the large prior investment in time and money in standard camera equipment, is a significant barrier to many photographers who would otherwise utilize digital photography.

Therefore, it would be desirable to allow the owner of a standard 35 mm camera to "convert" the standard camera to a digital camera, without having to modify the camera, without losing the benefits of any features of the standard camera, and without requiring owners of standard 35 mm cameras to forfeit their standard cameras simply to enjoy the benefits of digital technology.

SUMMARY

The present invention enables a photographer to easily convert a camera to take digital photographs. The apparatus replaces film and is structured to fit in the film compartment of a camera. The apparatus is an electronic device having a light detector that detects the opening and closing of the aperture of the camera, an imager for detecting the image to be photographed, and a digital memory unit for storing digitized information reflective of the photographic images. The imager receives radiated energy through the lens of the camera, allowing the external features such as telephoto and other lenses, F-stop and aperture controls, etc., of the camera to be used by the photographer to affect the image photographed.

The photocard can operate in a stand alone manner or can be coupled to an external electronic device via a flat flexible wire that passes out of the camera. The external device can be a general purpose of photo processing system that enables the user to display, modify and print out the images. Other external electronic devices may have additional memory, power, or may be coupled to a NTSC converter that converts the digital images to a television standard for viewing on a television monitor or screen. In some embodiments, the electronic device converts the digital images to one of a number of internet or World Wide Web standards, and provides data either in a telephone line or an ISDN format. In some embodiments, the external electronic device includes a short-range wireless transmitter, for transmitting images stored in the photocard's memory to a nearby television, or for downloading digital photographs to an external memory or to a magnetic medium such as a disk drive or tape drive.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
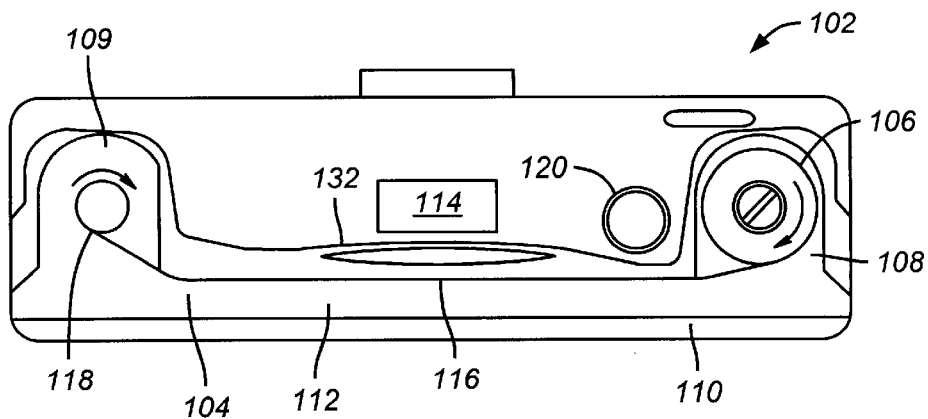
FIG. 1 illustrates the camera body of a prior art 35 millimeter camera.

Referring now to FIG. 1, a prior art 35 millimeter camera 102 is shown. Although such cameras are very well known, a brief overview of typical camera functions will introduce a context in which embodiments of the present invention may be more easily understood. A 35 millimeter camera 102 has a film chamber 104 for receiving an unexposed roll of film 106 into a substantially cylindrical film roll areas 108. The film chamber 104 includes a thin, substantially flat area 112, located behind the shutter aperture 114 and the cylindrical film roll area 108 which provides a larger region at one end of the film chamber 104 and a second cylindrical take up area 109. The film chamber 104 is encloseable by a film chamber door 110 that is opened to inset the unexposed roll of film 106. The flat area 112 may be part of the film chamber door 110 in which film is held while the shutter aperture 114 is open to expose a region 116 on the film to light passing through the aperture 114.

When the film chamber door 110 is closed while film is properly in place, a film take-up reel 118 rotates to draw onto the take-up reel 118 a portion of the film. Thereafter, each time the shutter button 120 is pushed to take a picture, the camera causes a shutter aperture 114 to open and allow light to pass through the shutter aperture 114 and expose a region of the film to the light.

As regions of the film are individually and sequentially exposed, a film take-up reel 118 temporarily draws the exposed regions on the film onto the take-up reel 118. In some cameras the take-up reel 118 automatically advances to accept more of the exposed regions of film, while in other cameras the take-up reel 118 must be mechanically advanced by the user. Once substantially all the film has been advanced onto the take-up reel 118 and the roll 106 is nearly empty, the film takeup reel 118 releases the film, and the exposed film is automatically or mechanically wound back into the roll 106. Then, after the film is wound back into the roll 106, the film chamber door 108 may be opened and the roll of used film removed.

Figure 2:
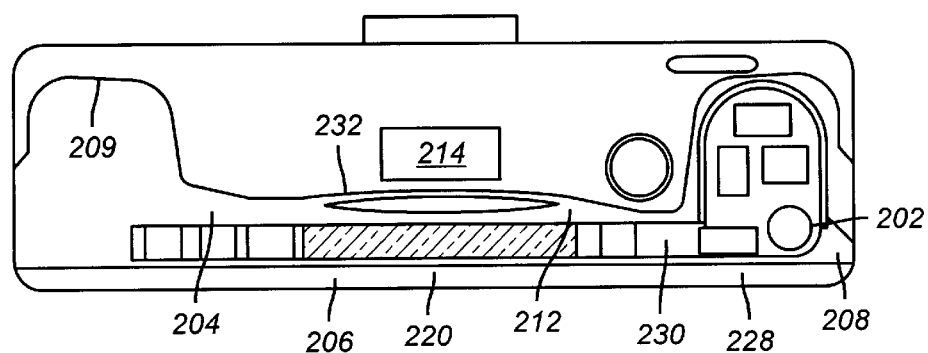
FIG. 2 illustrates one embodiment of the apparatus of the present invention.

FIG. 2 illustrates one embodiment of the present invention that adapts a camera to take digital photographic images. The present embodiment, an electronic camera-in-camera photocard, operates within a 35 millimeter camera. It will be apparent to those skilled in the art that the present invention can be used in other types of cameras utilizing different film sizes.

Referring to FIG. 2, the photocard 202 shown in is inserted into the film chamber 204 in place of film. Preferably, the photocard 202 is configured to fit into both the substantially flat area 212 and the cylindrical film roll area 208 of the film chamber 204. Because the described embodiment of the present invention replaces and thus obviates the need for film, the area 209 for receiving an unexposed roll of film is also available. Thus, the photocard 202 can be configured to be thicker at both ends of the card such that the thicker portions fit into areas 208 and/or 209 This provides additional space in which circuitry or power supplies (e.g., batteries) may be located. For example, a battery attachment is provided at the opposite end of the circuit board, such that when cylindrical batteries of a thin radius, such as AAA size batteries, are inserted into the battery attachment, and the circuit board 230 is inserted into the film chamber, the batteries occupy the space surrounding the film take-up roll. In still other embodiments, a flat dial shaped battery is included in a dial battery attachment coupled to the circuit board. Other means of providing electrical power to the circuit will be readily apparent to one of ordinary skill in the art upon reference to the present disclosure.

The photocard 202 can be formed of one or more portions and includes a circuit board 230, preferably approximately 1 to 2 millimeters thick, which fits within the film chamber 204 of the camera when the film chamber door 206 is closed. The film chamber door 206 of the film chamber 204 closes to enclose the photocard 202, such that a light detector of the photocard 202 is held in place in the substantially flat area 212 behind the shutter aperture 214. Preferably, the circuit board 230 is a printed circuit board and includes printed traces or wires providing electric connections between various elements mounted on the circuit board 230. Connections may be metal lines etched, or deposited on the surface of the circuit board 230. In some embodiments, bare die bonding or other means may be used to fabricate circuitry directly onto the circuit board 230, while other embodiments allow expandability by providing receptacles for surface mounted components that includes various logic and memory storage functions.

The circuit board 230 includes an imager 220, lens 232, memory 228 and other digital circuitry that may include both embedded logic and packaged integrated circuit devices. The digital circuitry is distributed among several regions on the circuit board 230 and in several locations on the photocard. Some of the digital circuitry is located on the surface of the photocard, while other portions of the digital circuitry are located internal to the cylindrical portion 208.

The embodiment described for a particular model of camera. Because different cameras have slightly different physical dimensions, it is apparent that some embodiments of the present invention would be designed specifically for particular models of standard cameras. However, for the same film size camera it is contemplated that some embodiments can be adjustable coupling the circuit board components onto rails that are adjustable either by a spring loading or screw mechanism that sets the length of the photocard to fit within the length of the film chamber 204.

Figure 3:
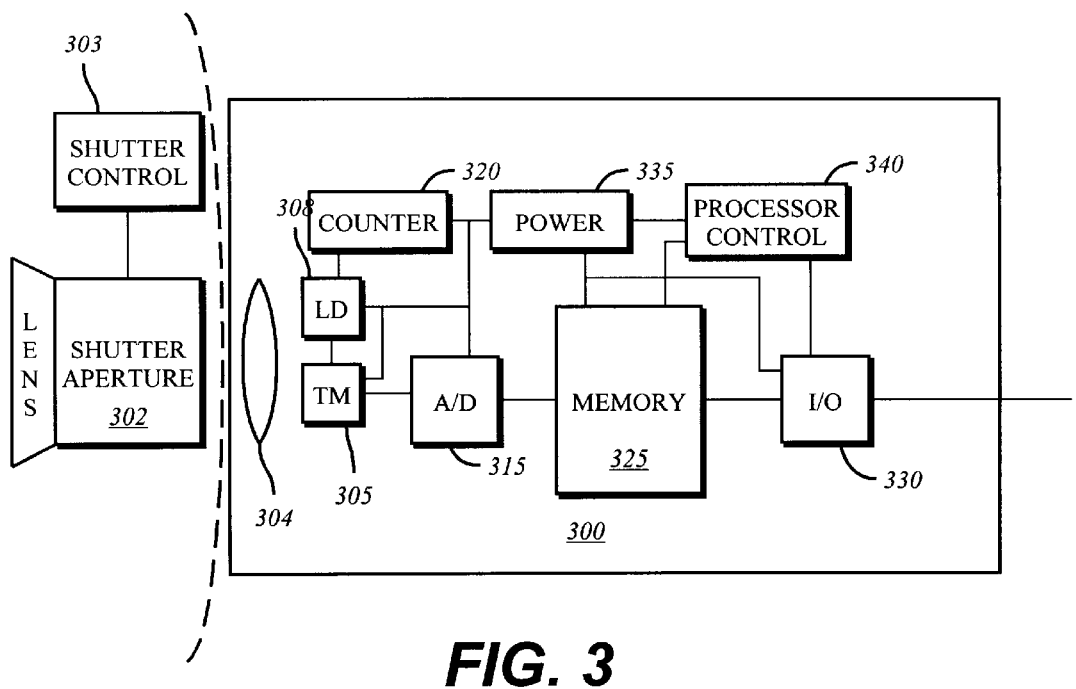
FIG. 3 is a simplified block diagram of one embodiment of the photocard of the present invention.

Referring to FIG. 3, a simplified block diagram of one embodiment of the photocard is described. As mentioned above, the electronic camera-in-camera photocard 300 includes an imager 305 (also shown as element 220 in FIG. 2) that is mounted on the photocard. The imager 305 captures the image the camera lens is directed at when the shutter aperture 302 is opened. Coupled to or incorporated into the imager 305 is a light detector 308 that detects the light that enters through the shutter aperture 302 when the user operates the shutter control 303 (e.g., depresses the button to take a picture) and the shutter aperture 302 is opened to take a picture. The light detector 308 controls the operation of the imager 305 such that image data collected when the shutter is opened. In one embodiment the light detector 308 controls the power to the imager 305. Alternately, the light detector 308 controls a passgate which permits the clock signal input that drives the imager 305 only when the shutter aperture 302 is open. In another embodiment, the light detector 308 controls passgates located between the signal output of the imager 305 and the inputs to analog to digital (A/D) converter 315. Thus, in this embodiment, the imager 305 remains powered and operational, but image data is only transferred out of the imager 305 when the shutter is detected as opened.

Preferably the imager 305 is implemented as a digital imager fabricated as a CCD (charged coupled device, also known as a bucket brigade device). The CCD in some embodiments includes a large number of small capacitors each having a small region of silicon between the capacitor terminals. When light or other radiant energy strikes the silicon, charge-hole pairs are formed in the silicon and are quickly drawn to the capacitor terminals, providing electric connection responsive to the incident light or other radiant energy.

Figure 5:
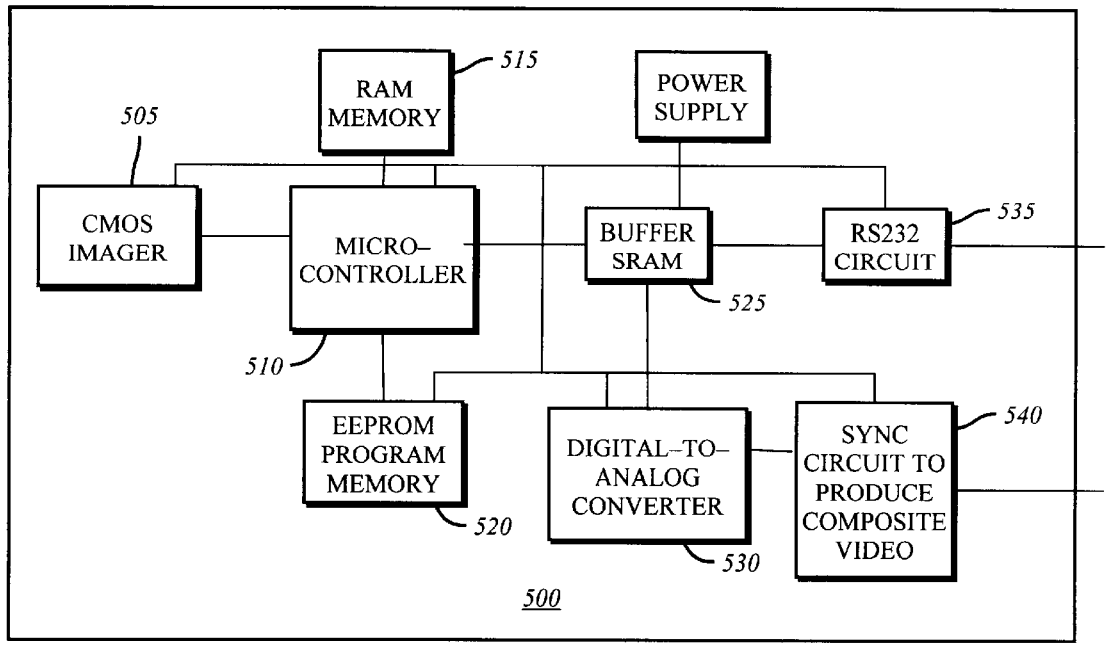
FIG. 5 is a block diagram of one embodiment of the photocard of the present invention using a CMOS imaging device.
Figure 6:
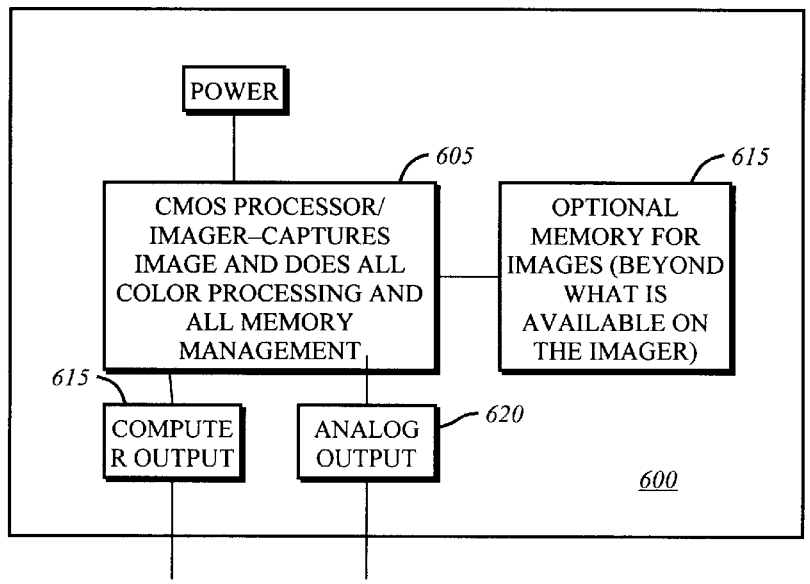
FIG. 6 is a block diagram of one embodiment of the photocard of the present invention embodied on an integrated silicon device.

It is contemplated that other imaging technologies can be used. For example, CMOS devices and/or PN diodes that respond to incident light, generating electronic signals detectable by a signal detector, can be used. The advantage to using a CMOS imager is that most or all of the functions of the photocard can be placed on a single integrated circuit. Unlike a CCD, and as is illustrated in the embodiments of FIGS. 5 and 6, a device fabricated using a CMOS process allows both processing devices and light sensing devices to be fabricated on a single chip, greatly reducing the cost and size of the overall system.

Furthermore, it is contemplated that the present invention can extend to photograph images in other spectra: other technologies responsive to radiant energy in any portion of the electromagnetic spectrum can be used to transduce the radiant energy to electronic signals detectable at the output of the imager. Thus, in some embodiments, the imager 305 is fabricated such that electromagnetic energy other than visible light may be detected, allowing photography in other spectra. For example, the imager 305 can be configured to detect a photograph subject's heat signature 305 such that "night vision" photography can be performed. In particular, Mercury Cadmium Telluride and other compounds, for example, respond electrically to nonvisible radiant energy, particularly infrared energy, and therefore allows photography in the corresponding spectra. Mercury Cadmium Telluride has an especially low bandgap, making the compound particularly suitable for photography in low energy and other nonvisible spectra.

Continuing with the present embodiment, the imager 305 is fabricated using CCD technology and charge-hole pairs are moved at a transfer rate through the silicon in the CCD device 305 to the A/D converter 315. Once converted to digital data, the data is stored in the memory 325. As the signals output from the CCD device 305 are output based upon position (e.g., column by column), position information relative to the matrix of the image sensed is maintained.

Because the size of each capacitor in a CCD imager is so small compared to the normal 35 mm negative, the imager 305 occupies only a small area on the photocard despite the large number of capacitors needed to satisfy resolution requirements (i.e., the number of pixels). Therefore, in some embodiments, an additional lens 304 (232 FIG. 2) provides further focus of light passing through the camera lens, since the imager 305 is much smaller than the region of film normally exposed in an exposure.

Digital circuitry 340, preferably a microcontroller or microprocessor, provides a number of different functions. One function is the analysis and translation of the digital data received from the A/D converter of data words and other signals. It is contemplated that the digital circuitry 340 performs some image processing to improve the image Such techniques, for example, edge detection or sharpening, cropping and softening, are well known in the computer graphics art. In addition, the digital circuitry 340, in some embodiments, structures the pixel data into data words according to a specified output format. As is apparent, the digital circuitry 340 can be configured to provide prespecified output formats, for example, formats compatible with predetermined computer or photo processing equipment that the digital data may be downloaded to, as a selectable option.

Preferably the digitally converted signals received from the CCD device 305 are configured into data words indicating the spatial planar coordinates of an individual CCD capacitor, and the chrominance and intensity of the light incident on the silicon of the CCD capacitor. It will be recognized that various digital data structures may be used to format the digital data. The data words thus collectively represent a pixel map of an image frame as photographed by the imager 305 when the shutter aperture 302 of the camera is open.

Preferably a digital counter 320 provides a digital count-signal indicating the number of times the shutter aperture of the camera has opened since the counter was last reset. This count value is indicative of the number of images collected since, for example, the last download of images from the photocard to an external device. In one embodiment, the counter 320 is a separate logic device coupled to the light detector 308. The light detector 308, when light is detected due to the opening of the shutter aperture 302, issues a single, such as a clock signal, to increment the count maintained by the counter. Alternately, the counter 320 can be embodied in the digital circuitry 340 which maintains the count and increments the count each time the digital circuitry 340 processes an image. Preferably the signal representative of the count is appended to the data words corresponding to the image received by the imager 220. Thus, data words generated on distinct openings of the shutter aperture 302 may be distinguished from other data words generated at the same planar spatial coordinates.

In one embodiment, a user of the photocard may, before or after taking a picture, select an image representation option, such as a color option, a grayscale option, or a black-and-white option. As is known to those skilled in the computer graphics art, the pixel data representing the image can be displayed in color, gray scale, etc. by performing different translations of the pixel data. Typically a translation table, such as color lookup table, is used.

If the image representation option is specified at prior to taking the picture, the data structure representative of the image sensed would include a field which identifies the option selected for a particular image or group of images. Although the camera photocard could be configured to provide this capability, it is also contemplated that this selection can be implemented as a post processing feature that is provided by a device external to the photocard, after the user down loads the images from the photocard. After download of the images, the user can then select the desired image representation option. It is noted that flexibility is achieved as the user can produce multiple versions, for example, both black-and-white and color versions, of the same photograph.

The pixel data and/or data words representative of the image are stored in a memory 325. Preferably a reusable nonvolatile memory is used. As will be described below, the contents of the memory 325 can be down-loaded to a larger memory or to other external devices and the photocard reused. The ability to erase and reuse memory 325, in addition to the ability to store data in a compact space, is extremely advantageous as the photocard may be reused, making obsolete the recurring expense of buying rolls of film.

Preferably a flash electrical erasable programmable read only memory (EEPROM) is used, although the present invention is not limited as such and other types of EEPROMs can be used. In this embodiment, the photocard may include a manually driven switch (such as a button) to erase the memory after the images are downloaded. Alternately, as part of the download process, the memory may be automatically erased. It is readily apparent that other types of EEPROMs can be used, and the erasure process required would have to be modified accordingly.

Although it is preferred that the memory 325 is nonvolatile and erasable, it is not limited as such and can be embodied as a volatile or a nonerasable memory media. For example, the memory 325 can be implemented in random access memory (RAM). However, the power supply 335 would have to provide the power to maintain the image information in the memory 325. Furthermore, a non-erasable media could be used. In this embodiment, the memory would be configured in a component that can be easily removed from the photocard in order to swap out the memory component once it is completely used. This embodiment may be advantageous for those users that wish to have the convenience similar to a roll of film. A distinct difference, however, is that the memory stores digital images and is capable of storing more photographs than a standard roll of film.

It should be realized that due to the variety of memory 325 devices available, different embodiments of the present invention allow different numbers of exposures or images to be stored. Furthermore, the photocard can be configured to generate different resolutions (i.e., number of pixels per image) of images as well as the number of bits per pixel. The resolution can be configured to vary according to the embodiment of the photocard used; alternately, the photocard could be configured to be field programmable, enabling the user to selectively decrease the number of exposures the memory is capable of storing for increased resolution. This resolution could be varied from image to image, for an entire photographic session or consistently applied to the images stored in the memory.

Power to the photocard 300 can be generated from a variety of sources. For portability, it is preferred that the power supply 335 is a battery. In one embodiment, the photocard is integrally formed with a battery. Alternately, the power supply 335 includes a connection to the camera battery and draws power from the camera battery typically used to power the camera flash and other electrical components. Preferably, additional batteries are provided as part of or adjacent to the photocard 3000. These batteries would be stored in one or both of the areas typically used to store a roll of film or take up exposed film (areas 208, 209, FIG. 2). Because the image is stored digitally in the memory and not on film, there is no danger of exposing film, and the film chamber door may be opened to recharge or replace the battery or other components without concern of damaging the photographic images taken.

The photocard 300 further includes output circuitry 330 for reading the images stored in the memory and downloading the images for viewing, post processing, editing, printing or the like. In its simplest form, the output circuitry 330 is a standard interface, such as an RS-232 interface, and controller that downloads the entire memory when the interface is connected to an external device, such as a computer system or digital photo processing or editing system. In this embodiment, the computer system would control the output circuit 330 to read the memory 325 and download the image information. Alternately, some intelligence can be added to the output circuit 330, or the digital circuitry 340 can be used to control the download of the digital images. Furthermore, it is contemplated that the photocard may include the necessary circuitry to drive certain equipment, such as a monitor or printing device, to display or print the digital images. In those embodiments, a processor or circuitry located on the photocard would provide the logic to configure the data in a compatible format. The photocard would also include, if needed, additional circuitry to perform digital to analog conversion or signals of prespecified levels compatible with the output device the photocard is coupling to. Thus, the photocard could be used, for example, to drive a monitor or a printer. The photocard could also enable the user to fax images through a telephone line using a coupled RJ-11 connector.

It is also contemplated that the photocard also includes circuitry to perform direct pixel to NTSC conversion, NTSC being a standard in the television industry. Furthermore, the photocard can be configured with the necessary logic and connectors to providing outputs compatible with a computer system and analog NTSC/PAL/SECAM output.

It can be seen that the photocard of the present invention provides a number of distinct advantages to the user. The user can continue to use the equipment he is familiar and comfortable with. In addition, because the image is digitally stored, distortion in the image and photographic errors can be corrected, minimizing the need to retake photographs and increasing the capability of providing the perfect photograph that can not be duplicated. The correction circuitry may be located on the photocard (e.g., in the digital circuitry 340) and automatically enabled or may be part of a post processing process executed on a photo editing or processing system. Image correction can correct, for example, astigmatism, coma, aberration, and other errors generated by the lens or imager.

But editability adds more than mere correction; editability also facilitates creative expression by including features that extend the capabilities of film-based technology, giving photographers unprecedented control over the photographs produced. It is contemplated that the photocard could also provide extremely high-precision and high-resolution control, e.g., aperture sizes and magnifications, over images, much more than would otherwise be allowed using only the camera knobs and dials.

Selectable options and features may be selected by placing certain switches on the card, such as dip switches, to specified states. Alternately, a remote control device 370 is used. The remote control 370 communicates with the photocard to select options and perform certain functions, such as the features and options discussed above, including image processing functions, data configuration options, output options and download options. Any type of remote control technology can be used. In the present embodiment, the remote control includes a radio receiver/transmitter that communicates with a radio receiver/transmitter on the photocard. By including a receiver/transmitter on both the photocard and the remote, the photocard can provide feedback to the user, via the remote. Alternately, to save on space and power consumption on the photocard, the remote can be configured with a transmitter and the photocard can be configured solely with a receiver.

The photocard could provide preprocessing functions that can mimic virtually any effect a photographer might desire, even if the effect is not achievable using ordinarily available photographic equipment. For example, the photocard could include a user-programmable preprocessing digital distorter, set by the user-photographer, that modifies the signals sent from the imager. Digital distortion can produce effects that cannot be achieved using film-based photography. In addition, the photocard could include an internal timer that allows integration of the image over time on the photocard itself, producing data that exactly simulate a photographic image that would be produced using film. This timer can be used to simulate opening a shutter extremely fast, or can be used in conjunction with the camera's own shutter speed to achieve varying results.

In particular, the photocard 300 can include control logic, which may be separate logic or logic that is embodied in the digital circuitry 340, that controls a shutter of the imager (the imager shutter is separate from the mechanical shutter aperture 302 of the camera). Using this feature, the camera can be set to operate in accordance with the mechanical shutter aperture speed or to operate at a speed much faster than the mechanical shutter aperture speed is capable of. Shutter speeds in ordinary cameras are normally limited to approximately 1/5,000 of a second, depending on the speed of the circuitry used. In the photocard of the present invention, the shutter speeds of the imager 305 can be set to approach 1/100,000 of a second. As noted, the imager shutter speed can be set to coincide with the mechanical shutter aperture speed of the camera. One way of achieving this is to configure the connections between the light detector 308 and the imager 305 such that when the light detector 308 detects light, indicative that the shutter aperture 302 of the imager shutter is opened, and when the light detector 308 no longer detects light, indicative that the shutter aperture has closed, the imager shutter is closed.

It should be noted that the features above do not necessarily replace the features of the camera itself; instead, these features augment the camera's own controls, allowing a photographer an incredible range of effects.

Figure 4:
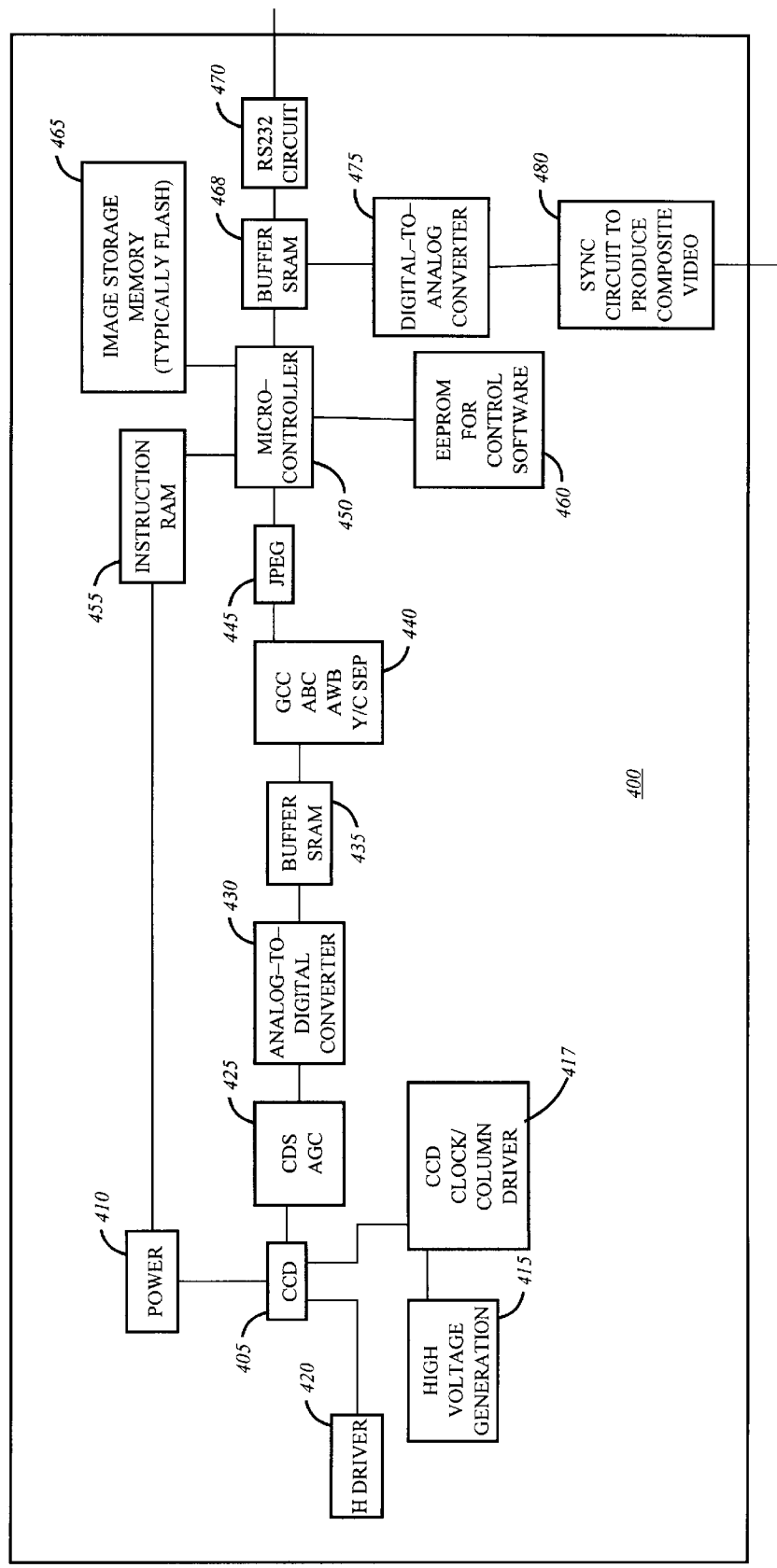
FIG. 4 is a block diagram of one embodiment of the photocard of the present invention using off the shelf components.

A more complete block diagram of one embodiment of the photocard of the present invention is shown in FIG. 4. The photocard 400 includes a CCD device 405 for detecting images when the shutter aperture is opened. The CCD device 405 is powered by power supply 410, which preferably also powers the other circuitry shown. The high voltage generator 415, coupled to power supply 410 powers the CCD clock/column driver 417. The clock/column driver 417 in conjunction with the horizontal driver 420, drive the pixel signals output from the CCD on a column by column basis. Automatic gain control 425 adjusts the gain on the pixel signals received for subsequent processing. The data is then converted to digital pixel data, by analog to digital converter 430, and is temporarily stored in a buffer 435 which provides an buffering mechanism to account for differing speeds of output of the CCD and input of the signal processing component 440.

Signal processing is then performed on the digital pixel data to enhance the image detected by the CCD device 405. Such techniques are well known in the art of digital image processing, For example, automatic white balance, automatic exposure control, gamma control can be applied. In addition, the luminance and chrominance can be separated for subsequent processing by the JPEG circuit 445. Although the above processing is shown in FIG. 4 as a single function block 440, it is contemplated that the circuitry encompass multiple circuits. Signal processing circuits and components are available from Samsung Corporation and Hitachi Corporation.

The JPEG (Joint Picture Experts Group) circuit compresses the digital images. JPEG is a standard for compression of digital photographic images. The output of the JPEG circuit is processed by microcontroller 450 as indicated by the microcontroller instructions stored in the nonvolatile memory 460 and uploaded to the instruction RAM 455 when the photocard is powered.

The microcontroller 450 controls the storage of the pixel data in the memory 465 and the subsequent output of the pixel data from the memory 465 to a computer system, printer or photo processing system, through the buffer 468 and output driver circuit 470, such as one compatible with the RS-232 standard, or to drive a monitor or other video device through the digital to analog converter 475 and sync circuit 480 to produce composite video signals reflective of the digital images. Embodiments can also include driver hardware and software to output the data through a telephone line connection, such as one in accordance with the RJ-11 standard, to enable the user to transmit or fax images over telephone lines.

The embodiment of FIG. 4 can be used for still photography or video. The difference in application dictates the size of the memory as video requires significantly more memory (roughly 100 Mbytes/minute). However, using compression, such as compression techniques compatible with the JPEG standard, the amount of memory needed can be reduced to 20 Mbytes per minute of recording.

FIG. 5 illustrates an alternate embodiment which uses a CMOS imaging chip which includes an on-board analog-to-digital converter, memory and some processing circuitry. This embodiment provides a significant space savings over the previous embodiment described. Referring to FIG. 5, the photocard 500 includes a CMOS imager 505 that detects an image when the mechanical shutter/aperture (not shown) and the imager shutter (not shown) are opened. The CMOS imager 505, such as one announced by VLSI Vision Limited, Edinburgh, Scotland, not only senses the image received, but performs signal processing and stores a limited amount of pixel data on chip. Thus, as can be seen in FIG. 5, most of the additional circuitry for performing signal processing is eliminated.

The pixel data output is received by the microcontroller 510 which executes instructions stored in the program memory 520, which can store the pixel data in memory 515 and subsequently output the pixel data through buffer 525 and output circuit 535 and/or digital to analog converter 530 and sync circuit 540. As the signal processing and A/D conversion of the image is performed on the CMOS imaging chip 505, the additional circuitry needed on the photocard is minimal.

It is contemplated that the features and functions described above with respect to prior figures can be implemented in silicon on a single chip. The resultant chip will incorporate the features of the previous embodiments described; however, by integrating the functions on a single chip, significant size and power and cost savings will be realized. In addition, the speed and image quality will be increased. FIG. 6 shows a simplified block diagram of a photocard system which can be integrated onto a silicon component. Referring to FIG. 6, the CMOS processor/imager 605 captures the images, performs any signal/color processing needed and stores the pixel data in the memory also integrated into the CMOS processor/imager 605. Additional memory 610 may also be provided if needed The CMOS imager/processor also includes the logic to generate output 615 compatible with computer systems or analog output 620 for driving a monitor. It is contemplated that the embodiment shown could include other features or connect to external devices that may provide additional features.

As noted above, the photocard connects to an external device for the download of the digital images. The external device can be a variety of devices compatible with the output of the photocard. For example, as shown herein, the photocard can be coupled to a device having an RS-232 interface. This device could be a general purpose computer or a computer specially configured to edit or process digital images, a printer or photo processing equipment. The device could simply be a mass storage device such as a disk drive. Other devices are also contemplated. Additionally or alternately the device could be a telephone, or can be a monitor or other analog equipment that receives video reflective of the digital images, such as those devices compatible with the NTSC or PAL standards.

Figure 7:
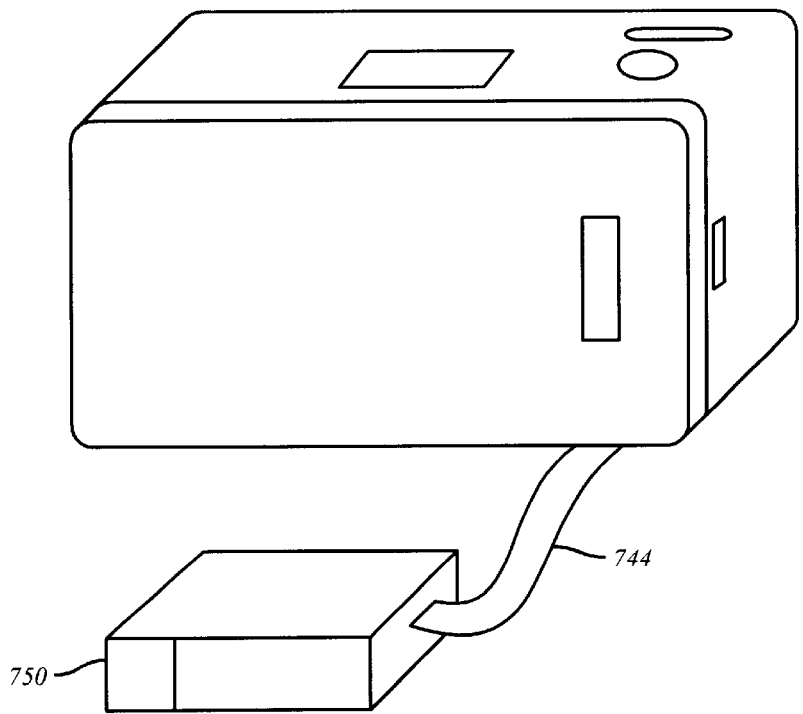
FIG. 7 illustrates one embodiment of the apparatus of the present invention as connected to an external device.

Examples of external connections are shown in FIGS. 7. Referring now to FIG. 7, the present invention also includes embodiments that have an external interface. A flexible flat wire 744 extends from the photocard (not shown) which is located in the film chamber 204. In an alternate embodiment, the wire 744 is replaced by a wireless, such as a radio or infrared, connection. The flat wire is thin and sturdy enough to enable the closure of the film chamber door and to not be damaged by closure of the film chamber door. The flat wire 744 connects to the external device 750 that, in various embodiments, includes an external power supply, additional memory, and additional circuitry. The additional circuitry, for example, can support or supplement the functionality located on the photocard. Furthermore, it is contemplated that the external device provides the connection to external processors, monitors, and recorders, thereby eliminating the need for the functionality to be located on the photocard. This saves space and also provides a easy mechanism for providing for additional connections without modifying the photocard.

In some embodiments, the external device 250 includes additional memory to capture digitized data representing images or parts of images as the images are taken. For example, the memory may be a storage device such as a disk drive or the like. For the user that intends to take a large quantity of pictures, the disk drive device can be constructed to withstand rough handling and of a small enough size to enable the user to clip the drive on his person, such as his belt. Alternately, this data can be transferred to an antenna circuit located external to the photocard for wireless transmission to a remote receiver that may be coupled to a variety of types of devices such as a television set or a video recorder, to a computer system having a processor, to an internet-linked processor, to a fax modem for transmission via telephone or ISDN lines, or to a satellite up-link.

Using the photocard of the present invention, images can therefore be transmitted quickly and efficiently to remote locations, can be displayed on computer or television equipment, can be transmitted via telephone lines as a fax, can be provided to the internet or worldwide web rapidly, and can allow digital manipulation of images. Facilities that allow rapid, high quality, high resolution printouts of digital images recorded on digital cameras can easily be used in accordance with the present invention to print out extremely high quality prints of photographs recorded using the present invention, using at least all of the digital enhancement techniques that may be used with the expensive digital camera technologies.

As noted above, some embodiments of the present invention include either a video-port, allowing either a direct wired, e.g., coaxial connection, or an antenna for a wireless signal connection with a typical television set. Other embodiments provide serial or parallel data transfer to a computer system, either directly or via a peripheral component. Additional intelligent components can be included in other embodiments, allowing using connectability to digital networks such as the internet. Still other embodiments allow connection to an external memory that a photographer might wear on a belt or might attach to an external surface of the camera. Such an external memory may be magnetic rather than solid state, allowing much greater storage capacity of digital images. Using wireless technology, other circuitry included in other embodiments allows easy wireless downloading of information to external hard drives or other computer equipment, or to a receiver coupled to a television set. For example, in one embodiment, a recreational user while on vacation, can fax photographs of the vacation to friends and family via a telephone phone.

The invention has been described in conjunction with the preferred embodiment. It is evident that numerous alternatives, modifications, variations and uses will be apparent to those skilled in the art in light of the foregoing description.

What is claimed is:

1. A digital camera that fits within a film cavity of a non-digital camera having a lens adapted to deliver radiated energy reflective of an image onto an imaging area of the non-digital camera and a shutter aperture positioned between the lens and the imaging area, comprising:

a light detector for detecting lights due to the opening of the shutter aperture of the non-digital camera; and a complementary metal oxide semiconductor (CMOS) integrated circuit chip coupled to the light detector and positionable in the film cavity without a card extending substantially throughout the film cavity and occupying the same area as the imaging area, the chip comprising:

an on-chip CMOS imager located adjacent to the shutter aperture of the non-digital camera, said imager sensing radiated energy reflective of the image received through the lens and shutter aperture of the non-digital camera when the light detector detects lights due to the opening of the shutter aperture of the non-digital camera, said on-chip imager generating signals reflective of the image, an on-chip CMOS analog-to-digital (A/D) converter coupled to the imager to convert the signals reflective of the image into digital signals, an on-chip CMOS processor coupled to the on-chip A/D converter to perform color processing on the digital signals and to compress the digital signals from the on-chip A/D converter, and an on-chip high density CMOS memory array coupled to the on-chip processor to store the compressed digital signals.

2. The digital camera as set forth in claim 1, further comprising a clock input coupled to the imager, and a passgate coupled to the light detector located between the imager and the clock input to the imager, said passgate controlled by the light detector such that when the light detector detects light due to the opening of the shutter aperture of the non-digital camera, the passgate is switched to permit clock signals to reach the imager to drive the imager to output signals reflective of the image.

3. The digital camera as set forth in claim 1, wherein the light detector controls power to the imager such that when the light detector detects light due to the opening of the shutter aperture of the non-digital camera, power is supplied to the imager to generate the signals reflective of the image.

4. The digital camera as set forth in claim 1, wherein the light detector controls an output from the imager such that when the light detector detects light due to the opening of the shutter aperture of the non-digital camera, output signals reflective of the image are output from the imager.

5. The digital camera as set forth in claim 1 wherein the lens located between the shutter aperture of the non-digital camera and the imager to focus the image received through the shutter aperture onto the imager.

6. The digital camera defined in claim 1 further comprising adjustable rails coupled to the IC chip and the light detector to adjust the digital camera within the film cavity.

7. The digital camera defined in claim 1 wherein the memory array comprises a random access memory.

8. The digital camera defined in claim 1 wherein the memory array comprises a flash memory.

9. The digital camera defined in claim 1 wherein the processor performs image processing.

10. The digital camera defined in claim 9, wherein the image processing comprises edge detection.

11. The digital camera defined in claim 9, wherein the image processing comprises image sharpening.

12. The digital camera defined in claim 13, wherein the image processing comprises cropping.

13. The digital camera as set forth in claim 1, further comprising at least one output port on the IC chip for outputting image data from the digital camera to an external device.

14. The digital camera as set forth in claim 13, wherein the at least one output port comprises a wireless transmitter for transmitting image data to a wireless receiver of the external device.

15. The digital camera as set forth in claim 13, wherein the at least one output port is coupled to a substantially flat cable that extends outside of the body of the non-digital camera when a film door of the non-digital camera is closed and connects to the external device.

16. The digital camera as set forth in claim 13, wherein the at least one output port outputs the image data in a format compatible with the RS-232 standard.

17. The digital camera as set forth in claim 13, wherein the at least one output port couples to a monitor, said digital camera further comprising circuitry that drives the monitor to display the image data on the monitor.

18. The digital camera as set forth in claim 13, wherein the external device drives a monitor to display the image data.

19. The digital camera as set forth in claim 13, wherein the external device drives a printer to generate a print of the image data.

20. The digital camera as set forth in claim 13, wherein the at least one output port operates in accordance with a telephone standard, said digital camera further comprising logic to generate a facsimile transmission that is output through the at least one output port to a coupled telephone line.

21. The digital camera as set forth in claim 13, wherein the at least one output port couples to the internet.

22. The digital camera as set forth in claim 13, wherein the at least one output port couples to the world wide web site.

23. The digital camera defined in claim 13 wherein the at least one output outputs the image in a computer compatible format.

24. A digital camera that fits within a film cavity of a non-digital camera having a lens adapted to deliver radiated energy reflective of an image onto an imaging area of the non-digital camera, a shutter aperture positioned between the lens and the imaging area, and a film compartment adapted to receive a power source, the camera comprising:
   a light detector for detecting light due to the opening of the shutter aperture of the non-digital camera; and
   a complementary metal oxide semiconductor (CMOS) integrated circuit (IC) chip coupled to the light detector and the power source, the IC chip is positionable in the film cavity without a card extending substantially throughout the film cavity and occupying the same area as the imaging area, the IC chip comprising:
      an on-chip CMOS imager located adjacent to the shutter aperture of the non-digital camera, said imager sensing radiated energy reflective of the image received through the lens and shutter aperture of the non-digital camera when the light detector detects light due to the opening of the shutter aperture of the non-digital camera, said on-chip imager generating signals reflective of the image,
      an on-chip CMOS analog-to-digital (A/D) converter coupled to the imager to convert the signals reflective of the image into digital signals,
      an on-chip CMOS processor coupled to the on-chip A/D converter to perform signal processing on the digital signals, and
      an on-chip high density CMOS memory array coupled to the on-chip processor to store the processed digital signals.

25. The digital camera defined in claim 24 further comprising adjustable rails coupled to the IC chip and the light detector to adjust the digital camera within the film cavity to compensate for different camera dimensions.

26. The digital camera defined in claim 24 wherein the IC chip drives a monitor to display the image data.

27. The digital camera defined in claim 24 wherein the memory array comprises a random access memory.

28. The digital camera defined in claim 24 wherein the memory array comprises a flash memory.

29. The digital camera defined in claim 24 wherein the processor performs image processing.

30. The digital camera defined in claim 29 wherein the image processing comprises edge detection.

31. The digital camera defined in claim 29 wherein the image processing comprises image sharpening.

32. The digital camera defined in claim 24 further comprising at least one output port on the IC chip for outputting image data from the digital camera.

33. The digital camera defined in claim 32 wherein the at least one output port comprises a wireless transmitter for transmitting image.

34. The digital camera defined in claim 32 wherein the at least one output outputs the image in a computer compatible format.

35. The digital camera defined in claim 32 wherein the at least one output port operates in accordance with a telephone standard.

36. The digital camera as set forth in claim 32 wherein the at least one output port couples to a world wide web site.

* * * * *